United States Patent [19]

Kishner

[11] 4,097,152
[45] Jun. 27, 1978

[54] SPECTROPHOTOMETER WITH VISUAL SPECTRUM DISPLAY

[75] Inventor: Stanley J. Kishner, Pomona, N.Y.

[73] Assignee: Kollmorgen Corporation, Hartford, Conn.

[21] Appl. No.: 717,587

[22] Filed: Aug. 25, 1976

[51] Int. Cl.² .............................................. G01J 3/42
[52] U.S. Cl. ...................................... 356/96; 35/19 B
[58] Field of Search ................... 35/19 B; 356/74–88, 356/93–100, 96

[56] References Cited

U.S. PATENT DOCUMENTS

| 2,279,646 | 4/1942 | Smith ..................................... 356/79 |
| 2,342,737 | 2/1944 | Jacobsohn ............................. 356/77 |
| 3,687,518 | 8/1972 | Steinhardt et al. .................... 356/74 |

*Primary Examiner*—F. L. Evans
*Attorney, Agent, or Firm*—Morgan, Finnegan, Pine, Foley & Lee

[57] ABSTRACT

An electro-optical device which measures the transmittance of a sample at any desired visible wavelength and simultaneously displays the visual transmittance spectrum of the sample.

1 Claim, 3 Drawing Figures

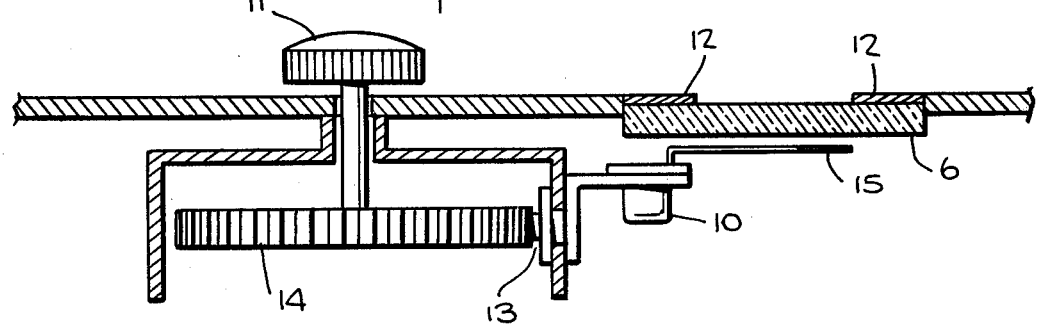
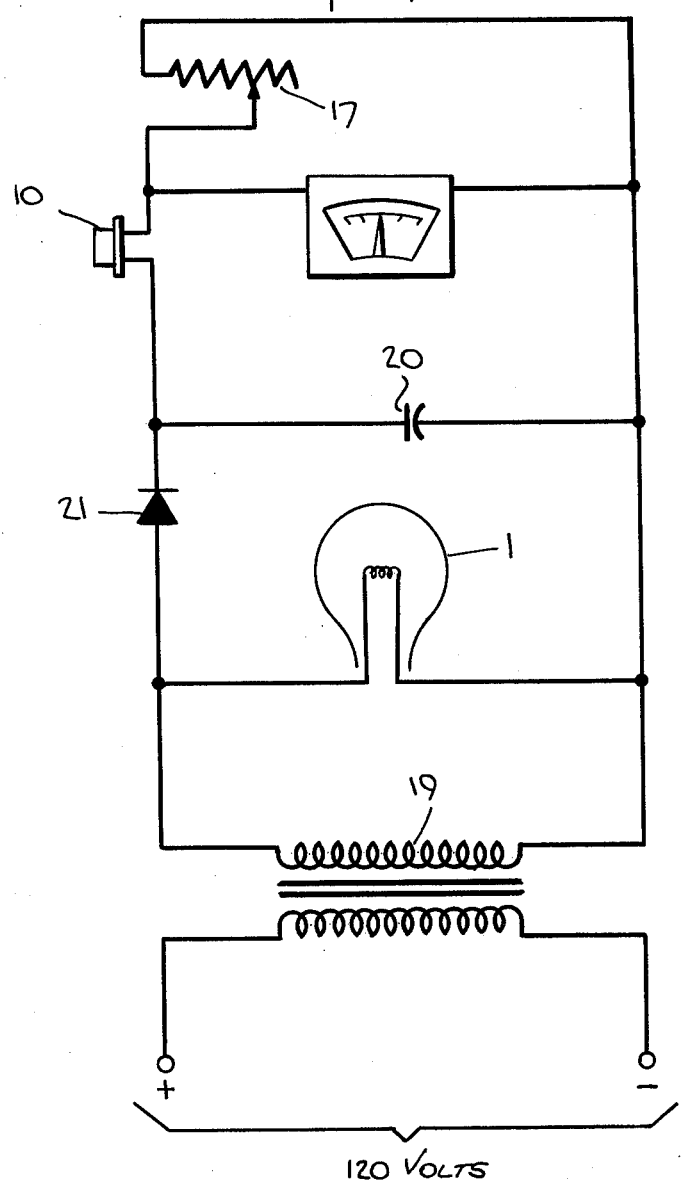

SPECTROPHOTOMETER WITH VISUAL SPECTRUM DISPLAY

BACKGROUND AND BRIEF DESCRIPTION OF THE INVENTION

Most spectrophotometers operating in the visible portion of the spectrum utilize three basic elements—a source of white light, means for dispersing light into its component wavelengths, and a photodetector. The light source is generally an incandescent lamp. The means for dispersing the light is most commonly a prism or diffraction grating. The photodetector may be a photomultiplier, or a solid state photoconductive or photovoltaic detector.

Although most optical systems used in spectrophotometers can provide accurate measurements of transmittance, there is a need in the field of education for a spectrophotometer that can simultaneously present a display of the visible transmittance spectrum of a sample. Such a graphic display can be invaluable in teaching the physics of color as well as the science of absorption spectrophotometry. The invention described herein utilizes a unique optical system comprising a single lens and a diffraction grating to simultaneously generate both a visual display and a spectrophotometric measurement.

BRIEF DESCRIPTION OF THE DRAWINGS

The above as well as other objects of the invention will become apparent from a consideration of the following description taken in conjunction with the accompanying drawings in which:

FIG. 2 is a sectional view of one portion of the embodiment of FIG. 1; and

FIG. 3 is a schematic diagram of the embodiment of FIG. 1.

DETAILED DESCRIPTION

Figure 1:
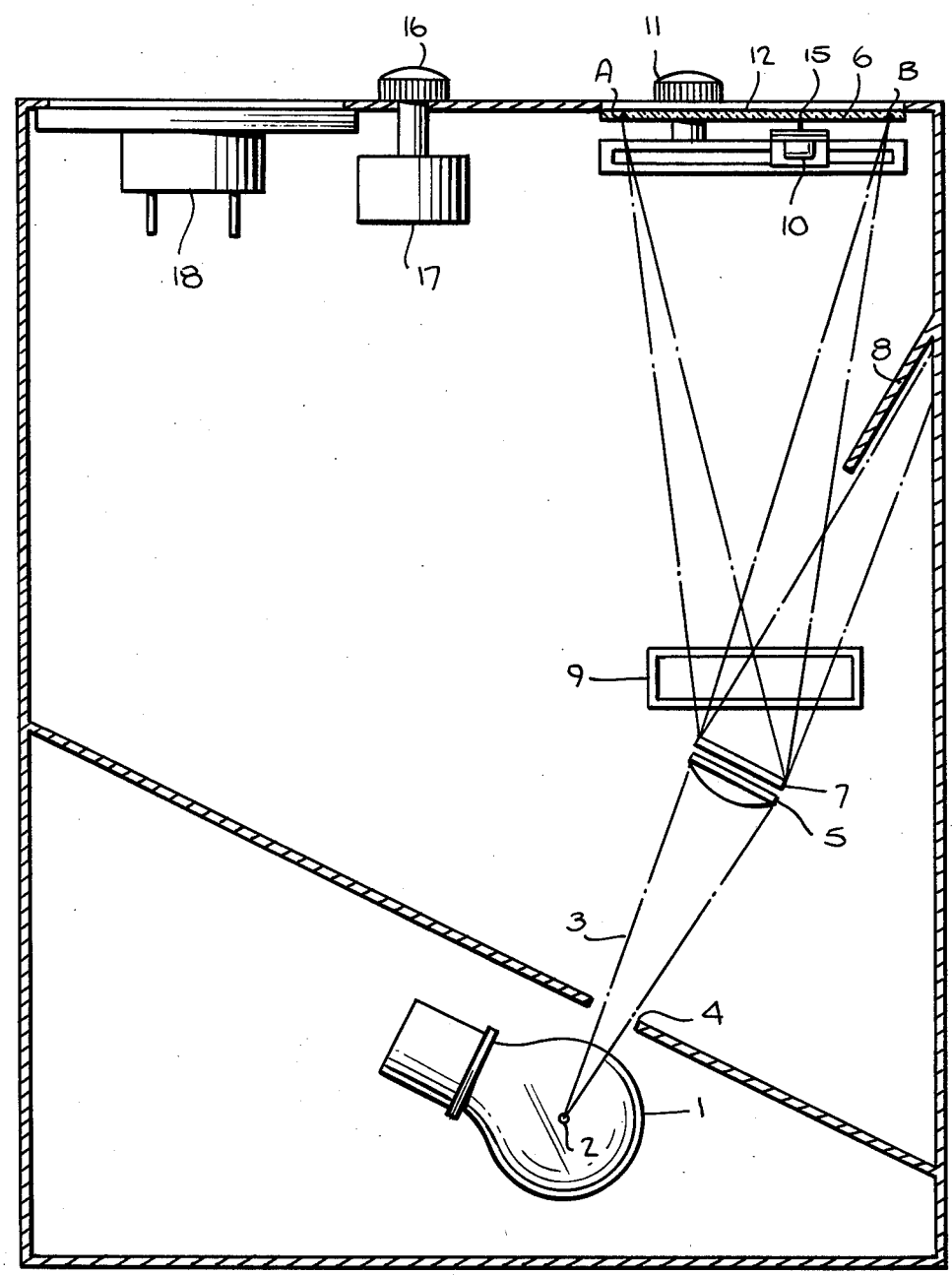
FIG. 1 is a top view of one embodiment of the present invention.

Referring to FIG. 1, a detailed description of one embodiment of the present invention will now be given.

The light source 1 is an incandescent lamp having a linear filament 2. The length of the filament is in a direction perpendicular to the plane of FIG. 1. The cone of light 3 that passes through circular aperture 4 impinges on lens 5. Lens 5 is placed at such a distance from filament 2 that it produces an approximate 3 times magnified image of the filament on the viewing screen 6. Screen 6 is made of a diffusing material, such as ground glass, opal glass, or a diffusing mylar sheet. By interposing a transmissive diffraction grating 7 between lens 5 and the viewing screen 6 the white light transmitted by lens 5 is dispersed, via the diffraction process, into its component colors. As a result, rays of different wavelengths are deviated at different angles, the angle of deviation being approximately a linear function of wavelength.

The rays of red light at 700 nanometers, the longest wavelength in the visible spectrum, are deviated the most, toward point A. Thus at point A, we find that an image of the filament 2 is formed by the lens 5 at a wavelength of 700 nanometers. Likewise, a violet (400 nanometers) image of the filament is projected at point B, the violet rays being deviated the least of any rays in the visible spectrum. Since the spectral content of the incandescent bulb 1 is continuous, a continuous chain of filament images is produced on the viewing screen 6, each at a different wavelength. These images fuse into what we recognize as the visible spectrum.

Light that is not diffracted by diffraction grating 7 impinges upon baffle 8, which is black in color and absorbs the undiffracted light. Baffle 8 prevents this light from reflecting off the walls of the device and scattering unwanted or stray light within the instrument. The sample, if liquid, is placed in a cuvette 9 and intercepts the rays diffracted by grating 7 before they impinge on the viewing screen 6 or photodetector 10. The thickness of the cuvette 9 does not significantly affect the focus of the spectrum on viewing screen 6 because of the large depth of focus of the optical system. Gelatin, glass or plastic slides can also be used as samples and may be put in place of the cuvette. Since the sample is inserted in the optical path after the light has been diffracted by grating 7, it is important for the sample to be of a uniform color.

Photodetector 10 is a photoconductive semiconductor which changes resistance as it is illuminated with light. It is mounted slightly closer to the lens 5 than viewing screen 6. The $f$/number of the optical system is high enough so that the spectrum is in focus both on the photodetector 10 and the viewing screen 6. Photodetector 10 is mounted on a rack and pinion assembly in order that it can be moved continuously between points A and B. Any other mechanical assembly that achieves this same motion is also acceptable. Motion of the detector is achieved by rotating knob 11.

To better understand the positioning of the photodetector 10 reference is made to FIG. 2. The image of linear filament 2 is high enough to illuminate the portion of viewing screen 6 not obscured by opaque mask 12, as well as photodetector 10. Thus, photodetector 10 measures the intensity of the light in the lower portion of the spectrum display, which portion is not seen, since it is obscured by opaque mask 12. The spectral bandwidth of the measurement is determined primarily by the size of the photodetector and is approximately 20 nanometers. The preferred means of translating photodetector 10 back and forth across the spectrum is rack 13 and pinion 14 shown. The wavelength at which photodetector 10 is centered is indicated on viewing screen 6 by the shadow of pointer 15, which is attached to the photodetector. In the preferred embodiment, this pointer is one of the two wire leads connected to the photodetector 10. The outer side of the opaque mask 12 is marked with a scale of wavelength ranging from 400 to 700 nanometers.

Referring back to FIG. 1, it will be seen that a measurement of sample transmittance is made in three steps. First, with no sample present, knob 11 is adjusted so that pointer 15 indicates, by means of the wavelength scale on opaque mask 12, the wavelength at which the measurement is to be made. Second, knob 16 is used to adjust potentiometer 17, which results in adjustment of the reading on ammeter 18. The ammeter scale is labeled in terms of percent transmittance, from 0% to 100%. The adjustment is made so that the meter 18 indicates a reading of 100%. Third, the sample is inserted and the transmittance is directly indicated on ammeter 18.

Referring now to the schematic diagram, FIG. 3, transformer 19 converts the 120 volt A.C. line voltage to a lower voltage, on the order of 6 volts. This voltage is used to energize lamp 1. Series diode 21 and parallel capacitor 20 serve to rectify and smooth the current, providing D.C. voltage for the measuring circuitry, which consists of photodetector 10, potentiometer 17 and ammeter 18. When no sample is present, the resistance of potentiometer 17, which is connected in parallel with ammeter 18, is varied by the user so that the current measured by ammeter 18 results in a reading of 100%. When the sample is inserted into the optical path, the resistance of photodetector 10 increases, thereby decreasing the current through ammeter 18. Since the resistance of photodetector 10 does not necessarily vary linearly with incident light intensity, and because the meter adds a fixed resistance to the circuit, the current measured by ammeter 18 is not linearly proportional to sample transmittance. This non-linear response is compensated for by providing a non-linear transmittance scale in ammeter 18.

The invention disclosed and claimed herein is not limited to the specific mechanism and techniques herein shown and described since modification will undoubtedly occur to those skilled in the art. Hence, departures may be made from the form of the instant invention without department from the principles thereof.

What I claim is:

1. A spectrophotometer for providing, simultaneously, a measurement of sample transmittance at any desired visible wavelength and a display of the visible transmittance spectrum of the sample comprising:
    (a) an incandescent lamp having a linear filament;
    (b) a lens for focusing the light produced by said filament;
    (c) a transmissive diffraction grating responsive to said light focused by said lens for dispersing said light into its component wavelengths and illuminating said sample with said dispersed light;
    (d) a diffusing viewing screen for displaying the dispersed light transmitted by said sample;
    (e) a photoconductive photodetector located proximate to and below said display and slightly closer to said diffraction grating than said screen for simultaneously, selectively sensing a portion of the spectrum of said dispersed light transmitted by said sample and displayed on the upper portion of said screen;
    (f) means for indicating which portion of the spectrum of said dispersed light transmitted by said sample is being sensed by said photodetector; and
    (g) means for providing a visual indication of the sample transmittance.

* * * * *